July 11, 1933.   C. B. MIRICK   1,917,268
MULTIPLE FREQUENCY RECEIVING SYSTEM
Filed April 11, 1930   3 Sheets-Sheet 1
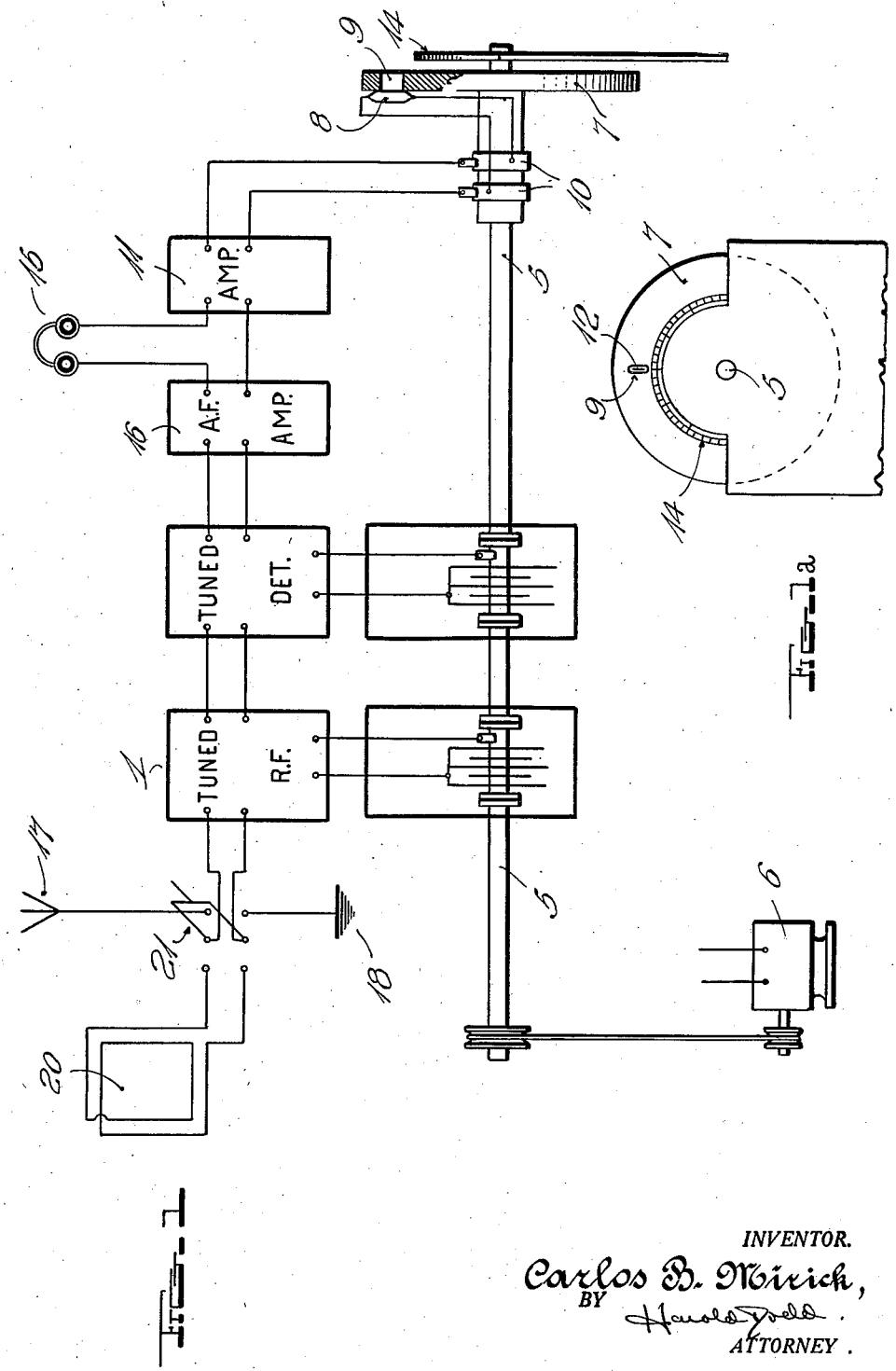
INVENTOR.
Carlos B. Mirick,
BY
ATTORNEY.

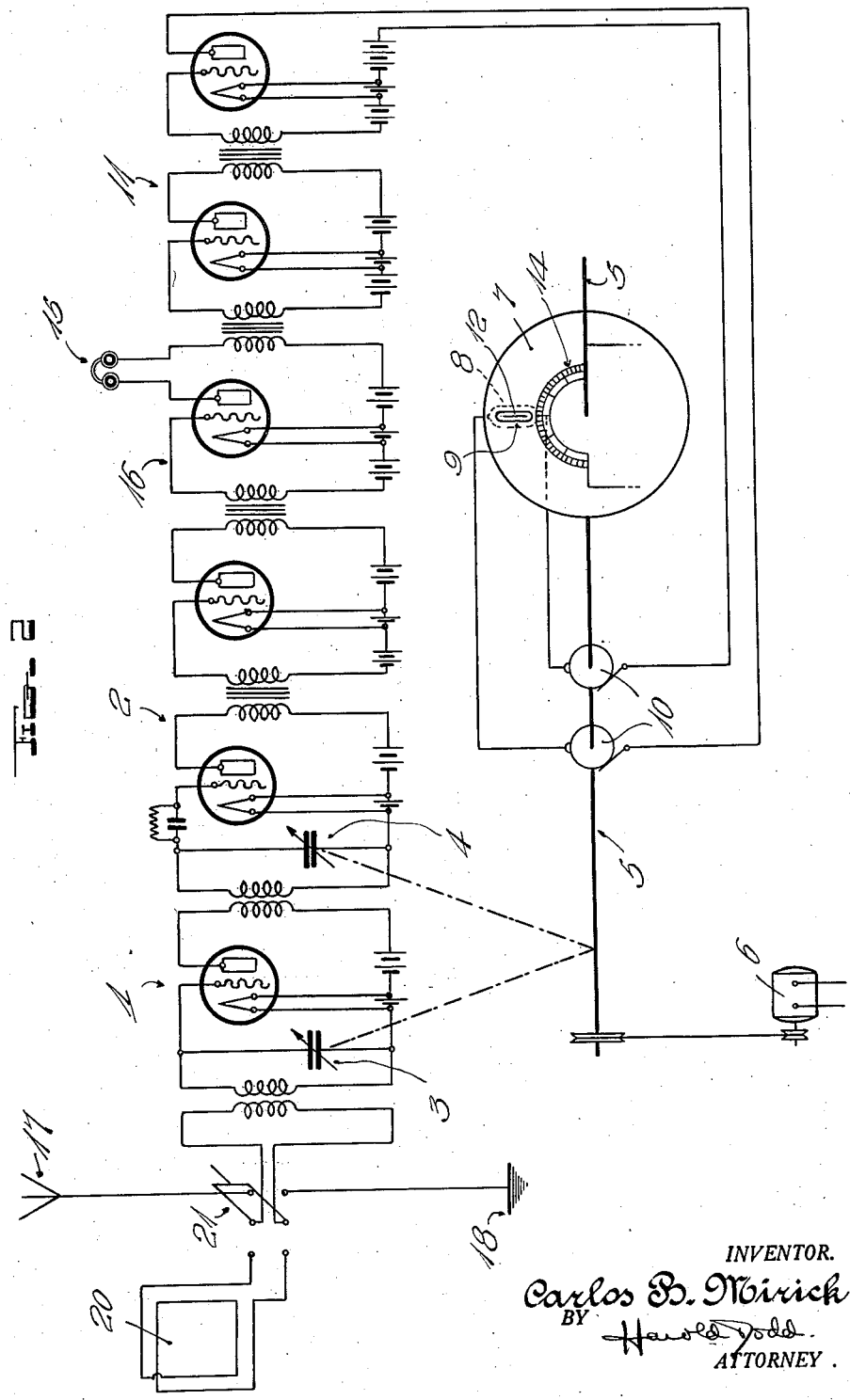

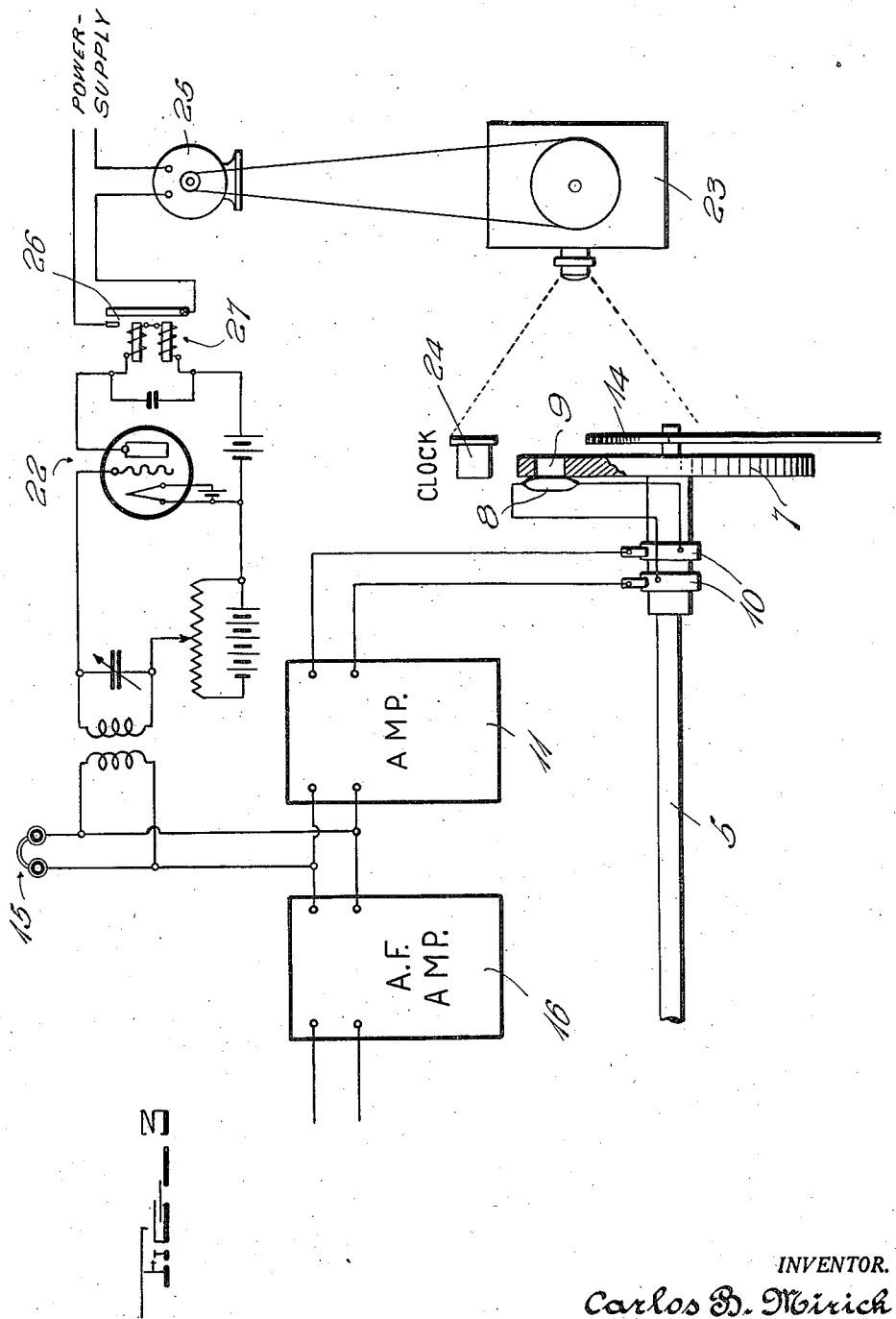

Patented July 11, 1933

1,917,268

UNITED STATES PATENT OFFICE

CARLOS B. MIRICK, OF WASHINGTON, DISTRICT OF COLUMBIA, ASSIGNOR TO NATIONAL ELECTRICAL SUPPLY COMPANY, OF WASHINGTON, DISTRICT OF COLUMBIA, A CORPORATION OF VIRGINIA

MULTIPLE FREQUENCY RECEIVING SYSTEM

Application filed April 11, 1930. Serial No. 443,581.

(GRANTED UNDER THE ACT OF MARCH 3, 1883, AS AMENDED APRIL 30, 1928; 370 O. G. 757)

My invention relates broadly to radio receiving systems and more particularly to a circuit arrangement for a multiple frequency receiving system.

One of the objects of my invention is to provide a radio receiving system having means for sweeping an entire frequency band and indicating continuously reception at any frequency or frequencies within this band.

Another object of my invention is to provide a tuning control system for radio receiving apparatus in which the tuning of the apparatus may be varied over a wide frequency band and signals which are being transmitted on a particular frequency visually indicated at the particular frequency at which such signals are received.

A further object of my invention is to provide a radio receiving system having visually operated means for indicating the frequencies at which stations may be transmitting within a given frequency range with means for photographically recording the signaling frequencies which are busy at any particular time.

A still further object of my invention is to provide a receiving circuit having means for receiving signaling energy uniformly from all directions over a wide frequency range for visually indicating the transmission frequencies which are busy in combination with directional receiving circuits for facilitating the determination of the radio bearing on the frequencies which are thus indicated.

Other and further objects of my invention reside in the arrangement of receiving system described more fully in the specification hereinafter following by reference to the accompanying drawings, in which:

Figure 1 schematically shows the arrangement of the apparatus employed in the receiving system of my invention; Fig. 1a is an elevational view of the indicator in the multiple frequency receiving system of my invention; Fig. 2 is a schematic circuit diagram of the apparatus employed in the system of my invention; and Fig. 3 illustrates one form of my invention in which a photographic record is made of the particular frequencies on which transmission occurs at a particular time.

The purpose of my invention is to provide a radio receiving system which will sweep an entire frequency band and indicate continuously reception at any frequency or frequencies within this band. Combined with this system is additional auxiliary apparatus which will automatically produce a photographic record indicating on what frequency or frequencies transmission was being received at any particular time. My system also utilizes a direction finding coil to facilitate the determination of radio bearings on the transmission frequencies which are visually indicated.

The means employed for accomplishing the purposes of my invention are:

(a) A radio receiving system of which the variable tuning element, such as inductance or capacity, is shifted continuously by rapid rotation of the variable member so that the tuning will rapidly vary over the entire range.

(b) A vacuum tube amplifier actuating a luminous discharge indicator which rotates with respect to a dial having frequency calibrations thereon in phase with the variable tuning element.

(c) A vacuum tube amplifier actuating a signal receiving device.

(d) A photographic and time recording device automatically operative upon receipt of signals for making a record of the active frequencies at any given time over a band of frequencies.

Referring to the drawings, Fig. 1 indicates a radio receiving system as above described having a radio frequency element 1 and a detector element 2, each tuned by variable air condensers 3 and 4, respectively. The rotary plates of these condensers are mounted on a common shaft 5 which is capable of being caused to rotate by driving motor 6. On the same shaft is a disk 7 providing a mounting for neon tube or luminous discharge device 8 which may be seen from the other side of the disk through slot 9. This neon tube 8 is connected through collector rings 10 to the output circuit of a suitable vacuum tube amplifier 11 so constructed that when the radio receiver is in tune with incoming signal the tube will be caused to glow. In operation the motor is driven at a speed which will cause disk 7 and condensers 3 and 4 to rotate at ten to fifteen revolutions per second. At this speed reception of a signal at some frequency within the tuning range of the receiver will cause the glow tube 8 as viewed through slot 9 to appear as a red line as shown at 12 and this line referred to a stationary scale 14 indicates the frequency of the reception. The calibration of scale 14 extends over a range corresponding to the tuning range of the condensers 3 and 4. If two or more transmitters are in operation at frequencies within the range of the receiver, two or more lines formed by the glow of the luminous discharge device 8 will be apparent simultaneously opposite the corresponding frequencies on scale 14. The neon tube 8 is energized only when it occupies a particular angular position corresponding to a resonance position for the tuning elements 3 and 4 for particular signaling frequencies. Because of the rotation imparted to disk 7 which carries neon tube 8 the tube which is lighted each time the receiver passes through a resonant point will indicate the busy frequency adjacent the calibrated scale 14 by illuminated mark at the different points around the scale designating frequencies which are busy.

By stopping the rotation of the disk at any one of these lines reception of radio signals may be accomplished through telephones 15 which connect to the output of audio frequency amplifier 16. If the radio input of the receiving system at radio frequency element 1 is shifted from antenna 17 and ground 18 to loop 20 by means of switch 21, the directional qualities of the loop 20 will permit taking of a radio bearing while the system is in rotation. When operating in this way swinging loop 20 to the position of minimum signal would result in extinguishing the neon tube 8. While I have shown neon tube 8 as movable throughout periodic cycles it will be understood that scale 7 may be shifted in lieu of moving neon tube 8.

The arrangement for automatic recording of transmission is indicated on Fig. 3 which shows the addition of a vacuum tube relay 22, a photographic device or camera 23, and a time recording device 24, other parts of the system remaining as in the first figure.

The camera 23 is driven by a motor 25 for shifting successive exposures into position for recording the time and frequency in use for that particular time under control of the mechanical relay 26 having its actuated winding 27 connected in the output circuit of electron tube relay 22 which connects at a position adjacent the telephones 15 to the output circuit of the audio frequency amplifier system 16 and is actuated upon receipt of incoming signaling energy simultaneously with the energization of neon tube 8 through amplifier 11.

Assume that the system is in operation but with no signal being received, the vacuum tube relay 22 which connects adjacent the telephones 15 remains open and the photographic mechanism 23 is not operated. The reception of a radio signal on any frequency within the operating band of the system causes vacuum tube relay 22 to close, which puts the photographic mechanism 23 into operation. This makes photographic records of the lines caused by the neon tube 8 and at the same time makes a record of the time as shown on clock 24. Upon cessation of radio signals, the photographic apparatus automatically stops, thus at the end of a given period the films obtained from the camera show during what periods and at what frequency or frequencies transmission had taken place.

My invention is particularly applicable in checking the frequency of transmission of various stations for determining the possible allocation of other frequencies within a particular frequency band. My invention is also applicable as a means for determining the presence of radio communication in a wide frequency band and for facilitating the determination of the direction of such transmission and locating the source of such transmission by means of the directional properties of the loop collector.

While I have described my invention in one of its preferred embodiments, I desire that it be understood that modifications may be made and that no limitations upon my invention are intended other than are imposed by the scope of the appended claims.

The invention herein described may be manufactured and used by or for the Government of the United States for governmental purposes without the payment to me of any royalty thereon or therefor.

What I claim as new and desire to secure by Letters Patent of the United States is as follows:

1. In a multiple frequency receiving system, a receiving apparatus, a visual indicating device connected to said apparatus, means for tuning said receiving apparatus periodically through a predetermined range of frequencies; means mechanically connected with said tuning means for synchronously rotating said visual indicating device adjacent a fixed calibrated scale, said visual indicating device being energized at points along said fixed scale corresponding to the transmission frequency indicated by said scale, and means controlled by the operation of the receiving apparatus for establishing a permanent record of the position of said indicating device with respect to said scale at the time interval when said indicating device is energized.

2. In a multiple frequency receiving system, a receiving circuit, means for tuning said receiving circuit through a multiplicity of different frequencies, a rotatable visual indicating device, and means mechanically connected with said tuning means for synchronously rotating said visual indicating device with respect to a fixed calibrated scale in timed relation to the variable tuning of said receiving apparatus, whereby the positions along said calibrated scale at which said visual indicating device is energized may be observed for determining the transmission frequencies which are in use over a given time period, and means controlled by the operation of said receiving circuit for permanently recording the position of said indicator device with respect to said scale when said indicating device is energized.

3. In a multiple frequency receiving system, a radio receiving apparatus, means for tuning said radio receiving apparatus over a relatively wide frequency band, a visual indicating apparatus including a calibrated scale and a device energized by said receiving apparatus, said visual apparatus being rotatably driven in synchronism with the variation of said tuning apparatus, said device being energized in the course of the rotative movement thereof at points along said calibrated scale determined by the frequency of the incoming signaling energy within the frequency range covered by said tuning apparatus, and means controlled by the operation of said radio receiving apparatus for establishing a permanent record of the position of said device with respect to said scale at the time intervals when said device is energized.

4. In a multiple frequency receiving system, a radio receiving apparatus, rotary tuning means for said radio receiving apparatus arranged to sweep a relatively wide band of frequencies, a luminous responsive device connected to said receiving apparatus and arranged to be illuminated when said tuning apparatus is resonant to a signaling frequency within the band of frequencies swept by said tuning apparatus, a calibrated scale adjacent said luminous responsive device, and means for synchronously rotating said luminous responsive device adjacent said calibrated scale in timed relation to the movement of said rotary tuning means, whereby the points along said scale at which said luminous responsive device is illuminated may be observed in the course of the rotative movement thereof for determining the frequencies within the band of frequencies covered by said tuning apparatus with which said tuning apparatus is resonant at any given time, and means actuated by said radio receiving apparatus for establishing a record of the position of said luminous responsive device with respect to said scale at the time interval of energization of said luminous responsive device.

5. In a multiple frequency receiving system, a receiving apparatus having an input system and an output system, directive and nondirective receiving means independently connectible with the input system of said receiving apparatus, rotatable tuning means for tuning said receiving apparatus over a relatively wide frequency range, a luminous discharge device connected to the output system of said receiving apparatus, a calibrated scale adjacent said luminous device having a range corresponding to the tuning range of said radio receiving apparatus, means connected with said rotatable tuning means for rotatably driving said luminous discharge device with respect to said calibrated scale while said luminous discharge device is energized in accordance with incoming signaling energy for indicating the active transmission frequencies within the tuning range of said receiver, and a photographic recorder operative under control of said radio receiving apparatus for establishing a permanent record of the position of said luminous discharge device with respect to said scale at the time of energization of said luminous responsive device.

6. A multiple frequency receiving system comprising a receiving apparatus, luminous responsive means connected with said apparatus, a calibrated scale adjacent said luminous responsive means, rotatable means for varying the tuning range of said receiving apparatus over a relatively wide frequency band, means mechanically connected with said rotatable means for synchronously rotating said luminous responsive means with respect to said calibrated scale whereby the active frequencies within said frequency band may be observed, and means controlled by the operation of said receiving apparatus for establishing a permanent record of the position of said luminous responsive means with respect to said scale at the time of energization of said luminous responsive means.

7. A radio receiving system including an electron tube amplifier circuit having a multiplicity of tuned stages, rotatable mechanism for periodically tuning said amplification stages through a predetermined frequency range, a fixed calibrated scale, a rotary indicator mechanically connected with said rotatable mechanism and adapted to be driven in synchronism with the movement of said mechanism adjacent said fixed calibrated scale, connections between the output of said amplifier circuit and said indicator whereby signaling energy on selected frequencies within the range of frequencies of said amplifier circuit effects a luminous response of said indicator at selected positions along said calibrated scale, a photographic recorder disposed in alignment with said indicator and said calibrated scale, and a circuit controller operated by a portion of the output of said amplifier circuit for rendering said photographic recorder effective simultaneously with the luminous response of said indicator to signaling energy for graphically recording the position of said indicator with respect to said calibrated scale at time intervals when said indicator is energized.

CARLOS B. MIRICK.